United States Patent
White

[15] 3,693,811
[45] Sept. 26, 1972

[54] SLIDE CONVEYOR SYSTEM AND METHOD

[72] Inventor: James C. White, Rutherford, N.J.
[73] Assignee: Propper Manufacturing Co., Inc.
[22] Filed: Dec. 1, 1970
[21] Appl. No.: 94,092

[52] U.S. Cl.................214/8.5 G, 214/152, 221/353
[51] Int. Cl...............................................B65g 59/06
[58] Field of Search...214/8.5 R, 8.5 A, 8.5 F, 8.5 G, 214/152; 221/353

[56] References Cited

UNITED STATES PATENTS

| 256,511 | 4/1882 | Stillwell | 214/8.5 G |
| 1,530,387 | 3/1925 | Marra | 214/8.5 G UX |
| 71,521 | 11/1867 | Lake | 221/253 |

Primary Examiner—Robert G. Sheridan
Assistant Examiner—George F. Abraham
Attorney—Amster & Rothstein

[57] ABSTRACT

A conveyor system for use in the manufacture of glass microscope slides for feeding slides from a storage bin where they are stacked face-to-face to a work station for individual processing includes an endless conveyor belt positioned beneath the storage bin, with the bin and adjacent portions of the conveyor being submerged in a liquid. The liquid creates a film between adjacent slides, permitting slides to slip easily one with respect to another from the bin to the conveyor.

5 Claims, 4 Drawing Figures

PATENTED SEP 26 1972 3,693,811
FIG. 1.
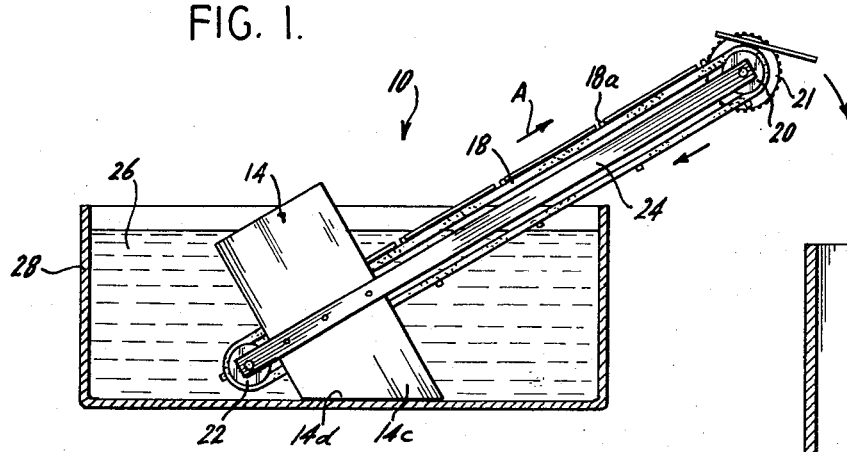
FIG. 4.
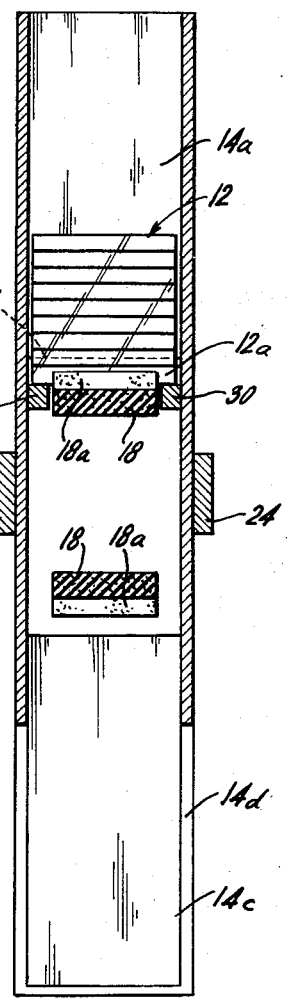
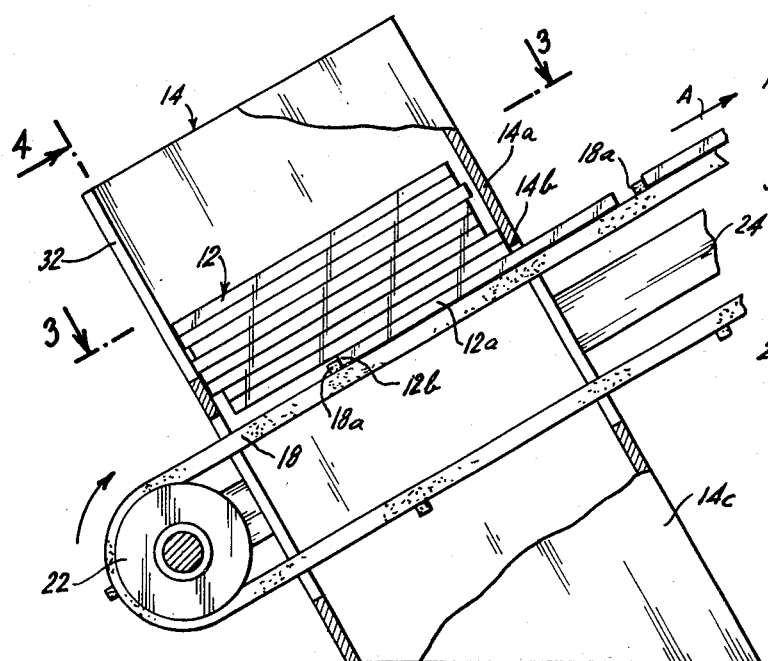
FIG. 2.
FIG. 3.
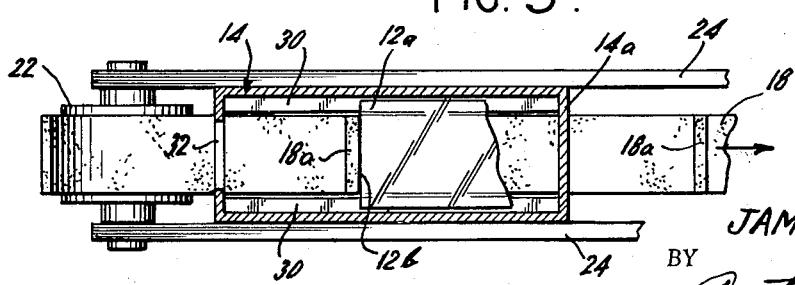
INVENTOR.
JAMES C. WHITE
BY
Amster Rothstein
ATTORNEYS

SLIDE CONVEYOR SYSTEM AND METHOD

This invention relates generally to materials handling equipment and methods and more specifically to a conveyor system for handling glass microscope slides during manufacture.

The manufacture of microscope slides conventionally involves rough cutting sheets of glass to appropriate slide size (frequently 3 × 1 inches), grinding the rough cut slide edges to create a uniform edge configuration, cleaning and packaging the slides.

In the handling of glass microscope slides during manufacture, slides are frequently assembled in a face-to-face stacked configuration for batch handling and storage. For example, the edges of rough cut slides are frequently ground by packing the slides face-to-face in a jig with their edges exposed and grinding the edges of many slides simultaneously in a batch operation.

In other aspects of slide manufacture, the slides cannot be properly processed on a batch basis but require individual handling. These processes include, for example, the individual washing of microscope slides where slides on a conveyor platform are individually passed through detergent, washing and rinsing stations. Such individual washing has been found to be the most desirable way to create a uniformly clean slide product. Various methods of batch washing have been tested, but it has been found that none of these methods provides an adequate substitute for individual cleaning.

To make the individual washing of microscope slides economically feasible, it has been found desirable to automate the processing of such slides, including the feeding of slides into the washing station. However, feeding glass slides in automated equipment from a stacked configuration (as in the grinding process) to an individually spaced condition on a conveyor (suitable for washing) has proved difficult because slides packed face-to-face in batches tend to adhere together and not to slip one with respect to another. This slip resistance, which is in part due to the formation of an oxide layer on the slide surface, has been widely noted in the slide manufacturing industry and in large measure has prevented the automation of this aspect of slide manufacture. In prior attempts to create slide feed systems of this type, the adhesion between adjacent slides has made it impossible to obtain uniform feeding of slides and slides which stick together are frequently broken by the feeding equipment before they can be separated. In addition, the conveyor systems of the prior art tended to chip the delicate slide edges and to scratch the slide surfaces, reducing the quality of the final product.

Accordingly, it is an object of the present invention to provide an improved slide manufacturing method employed automated slide handling apparatus which eliminates the substantial deficiencies of the prior art.

It is a further object of the present invention to provide apparatus for feeding microscope slides or other glass plate parts from a stack configuration to an individually spaced configuration which permits a relatively uniform feeding of slides without breaking, chipping, scratching, or otherwise damaging the slides.

In accomplishing the above objects and in accordance with a preferred embodiment of applicant's novel method, applicant wets stacked slides with a liquid while drawing the slides off the stack one at a time. The liquid creates a thin film between adjacent slides permitting slides to slip easily, one with respect to another, avoiding the adhesion problem and preventing damage to the slides.

Preferred apparatus for the practice of applicant's methods comprises a slide bin for receiving slides in face-to-face stacked condition, conveyor means passing adjacent the slide bin for drawing slides one at a time from the bin, and a reservoir of liquid with adjacent portions of the storage bin and the conveyor being submerged in the liquid to create a film between adjacent slides, permitting slides to be withdrawn from the bin one at a time without damage.

Further objects and advantages of the present invention will be appreciated by reference to the following detailed description of the presently preferred but nonetheless illustrative embodiment in accordance with the present invention wherein:

FIG. 1 is a side elevation of applicant's conveyor system;

FIG. 2 is a side elevation, partially broken away, showing applicant's conveyor system on a larger scale;

FIG. 3 is a cross-sectional view taken along line 3—3 in FIG. 2, showing only part of the lower most slide in the stack; and FIG. 4 is a cross-sectional view taken along line 4—4 in FIG. 2, on an enlarged scale.

Referring now to the drawings, applicant's conveyor system 10 is adapted to transport glass microscope slides 12 from a slide bin 14 where they are arranged in stacked face-to-face condition to a conveyor which feeds the slides individually into appropriate processing equipment such as washers, brushes, etc. Applicant's conveyor system includes a conveyor belt 18 which draws slides out of bin 14 and carries them upwardly to the appropriate processing equipment (not shown). Belt 18 travels in an endless loop over power sprocket 20 and idler wheel 22 which are pivoted at opposite ends of a support frame 24. Power sprocket 20 is driven from any appropriate source of power (not shown) such as a co-acting gear drive system, a chain drive, or other drive means well known in the material handling arts.

Conveyor belt 18 includes a series of upstanding transverse projections 18a, extending substantially across the entire width of the belt. The height of projections 18a is preferably slightly less that the thickness of the microscope slides being handled. Slide bin 14 includes a slide support ledge 30 which extends inwardly from the lateral walls of the bin to maintain slides 12 at a desired height in the bin. The lower most slide 12a rests on ledge 30, with the remaining slides tacked above. As best seen in FIG. 4, belt 18 is slightly narrower than the separation between the inner edges of ledges 30 and passes between the ledges with projections 18a extending above the upper ledge surface.

The forward wall 14a of bin 14 includes a lower restraining lip 14b, positioned at a selected height above the ledge 30. This height is selected to be slightly greater than the thickness of a single microscope slide but smaller than the thickness of two microscope slides, permitting a single slide to slip in a forward direction (the direction of arrow A in FIG. 2) between the lip 14b, and the ledge 30.

As the upstanding ridge 18a on conveyor 18 passes beneath bin 14, it engages the rear edge of the lower most microscope slide 12b, driving the slide forward between lip 14b and ledge 30. The next slide above slide 12a, which may tend to be drawn along with slide 12a, engages the forward wall 14a of bin 14 just above lip 14b and it is prevented from passing out of the bin.

In order to make the slide "slippable" to prevent them from sticking to one another in bin 14 as they are drawn from the bin, the lower portion of bin 14 and the adjacent portion of conveyor 18 are submerged in a tank 28 containing a water detergent solution 26. The water detergent solution which has a very low surface tension tends to create a film between adjacent slides 12 permitting slide to slip more freely than has heretofore been possible. This slipping quality permits slides to be fed at a relatively uniform rate, with each projection 18a drawing a single slide from the bin. At the same time, the detergent film prevents slides from scratching or slipping as they slide from the bin.

If, in spite of detergent solution 26, slide 12a and the slide immediately above it, tend to stick together as slide 12a is drawn from the bin, applicant's system is designed to release slide 12a and at the same time draw it slightly away from the sticking slide, permitting the detergent solution to enter between the slides so that the succeeding projection 18a will draw the slide from the bin in the manner described above. This is accomplished by fabricating belt 18 and projections 18a of a relatively flexible material so that if slide 12a sticks in the bin, belt 18 gives slightly, drawing projection 18a downwardly under the rear edge of slide 12a, beneath the lower slide surface and out of the bin. This action tends to draw the rear edge of slide 12a downwardly away from the lower face of the next adjacent slide permitting detergent to fill the space between the slides so that slide 12a will be easily withdrawn by the next projection.

As the result of this action, a projection 18a may from time-to-time pass out of bin 14 without drawing a slide. However, this slight irregularity in material flow does not significantly interfere with the manufacturing process and, at the same time, prevents slides from being damaged.

In the construction shown in the Figures, the slide bin includes a lower section 14c having a biased lower edge 14d adapted to rest on the floor of tank 28. This configuration permits the slide conveyor apparatus to stand freely in the tank 28. Preferably, the entire assembly is pivoted from the pin in power sprocket so that the entire conveyor assembly can be easily lifted out of the tank 28 for repair if necessary.

As shown in the Figures, the bin 14 includes a finger slot 32 in its rear wall extending downwardly from its upper edge. This slot permits an operator to fill the bin with slides by placing slides directly on ledge 30. Without slot 32, it would be necessary to drop slides into the bin from the top of the bin, possibly damaging the delicate slide surfaces.

It is to be understood that the drawing shows only a single conveyor line and a single slide bin. In a preferred embodiment of applicant's invention, many such conveyor lines and bins may be positioned side-by-side in tank 28 with the bins being maintained relatively full by an operator so that several parallel rows of individually spaced slides will be fed to the processing equipment.

Applicant's slide system thus permits slides to be fed from a packed face-to-face stack (as used in batch processing) into an individually spaced arrangement on a conveyor (for washing or other individual processing) without scratching, chipping, or otherwise damaging the slides. At the same time, where a water detergent solution is used and the process which follows involves washing the slides, the slides are being preliminarily soaked in a detergent prior to washing which aids the washing process.

It is to be understood that the above described arrangements are merely examples of the principles of the present invention. Numerous additional embodiments of the present invention will be immediately apparent to those skilled in the art without departing from the spirit or scope of the present invention as defined in the following claims.

What is claimed is:

1. A conveyor system for individually feeding glass microscope slides from a storage location where they are stacked in face to face relation to a processing station comprising a slide bin for receiving slides in said stacked face to face relation, said slide bin having an exit opening at its forward end, a conveyor passing beneath said bin adjacent said opening for drawing said slides one at a time through said opening onto the upper surface of said conveyor, and a liquid reservoir, the lower portion of said slide bin including said opening and the adjacent portion of said conveyor being submerged in said liquid so that adjacent slides become separated by a thin film permitting slides to be drawn from said opening one at a time without damage.

2. Apparatus in accordance with claim 1 wherein said liquid is a water detergent solution.

3. A conveyor system for individually transporting glass microscope slides from a stacked configuration to a processing station comprising a slide bin having inwardly extending lateral flanges forming a ledge for supporting said stacked slides, the forward wall of said bin forming a restraining lip spaced above said ledge by a distance greater than the thickness of a single slide but smaller than twice the thickness of a single slide, a conveyor having upstanding transverse ridges, said conveyor passing between said flanges with said ridges extending above the upper surface of said ledge whereby said ridges engage the lowermost slide in said bin drawing said slide to said conveyor, and a liquid reservoir, adjacent portions of said bin and said conveyor being submerged in said liquid reservoir so that slides stacked in said bin become separated by a thin liquid film permitting slides to be drawn out of said bin one at a time without damage.

4. Apparatus in accordance with claim 3 wherein said conveyor and said transverse ridges are fabricated of a flexible material so that if the lowermost slide in said bin adheres to the next adjacent slide in said bin, said ridges pass downwardly along the rear face of said lowermost slide and forward under said lowermost slide, drawing said lowermost slide away from said next adjacent slide and permitting introduction of said liquid between said lowermost and next adjacent slides.

5. A method for individually transporting glass microscope slides one at a time from a stacked configuration to a processing station including the steps of assembling a plurality of microscope slides in stacked face to face relation, submerging at least a portion of said slide stack in a liquid reservoir, maintaining said slide stack in said submerged condition for a period sufficient to permit introduction of liquid intermediate adjacent slides of said stack, engaging the lowermost one of said slides in said stack along one of its peripheral edges and applying a force to said lowermost slide in a direction parallel to the plane of said slide face while applying a restraining force to the opposite edge of the stacked slide next adjacent said lowermost slide, thereby imparting lateral motion to said lowermost slide while permitting said next adjacent slide to maintain its original position.

* * * * *